(12) United States Patent
Merbach et al.

(10) Patent No.: US 7,397,943 B2
(45) Date of Patent: Jul. 8, 2008

(54) METHOD AND ARRANGEMENT FOR TOUCHLESS DETECTION OF DATA OF UNEVEN SURFACES

(75) Inventors: Peter-Michael Merbach, Zella-Mehlis (DE); Rudolf Hauke, Niederstotzingen (DE); Hans-Peter Nothaft, Neu-Ulm (DE)

(73) Assignee: TBS Holding AG, Pfaeffikon (CH)

( * ) Notice: Subject to any disclaimer, the term of this patent is extended or adjusted under 35 U.S.C. 154(b) by 662 days.

(21) Appl. No.: 10/509,436

(22) PCT Filed: Apr. 10, 2003

(86) PCT No.: PCT/DE03/01174

§ 371 (c)(1),
(2), (4) Date: Sep. 28, 2004

(87) PCT Pub. No.: WO2004/093000

PCT Pub. Date: Oct. 28, 2004

(65) Prior Publication Data

US 2005/0117784 A1 Jun. 2, 2005

(30) Foreign Application Priority Data

Apr. 8, 2003 (DE) ................................. 103 15 923

(51) Int. Cl.
*G06K 9/00* (2006.01)
*G06T 15/00* (2006.01)

(52) U.S. Cl. ........................ 382/154; 382/124; 345/419; 348/42; 356/12

(58) Field of Classification Search ......... 382/115–127, 382/154, 285; 345/419–427; 356/12–14; 348/42–60

See application file for complete search history.

(56) References Cited

U.S. PATENT DOCUMENTS 4,553,837 A 11/1985 Marcus ........................ 356/71

(Continued)

FOREIGN PATENT DOCUMENTS

DE 10103622 8/2002

(Continued)

OTHER PUBLICATIONS

Chun-Jen Tsai et al., "Model-based Synthetic View Generation from a Monocular Video Sequence"; Image Processing, 1997; International Conference on Santa Barbara, CA, USA Oct. 26-29, 1997, Los Alamitos, CA, USA, IEEE Comput. Soc., US, Oct. 26, 1997, pp. 444-447, XP010254203, ISBN: 0-8186-8183-7.

(Continued)

*Primary Examiner*—Aaron W Carter
(74) *Attorney, Agent, or Firm*—Darby & Darby

(57) ABSTRACT

A method for detecting data of an uneven surface of an object includes the following steps: illuminating at least one of stripes and a grid on the uneven surface using at least one light source; detecting, without a touching contact, light reflected from the uneven surface at a plurality of discrete locations so as to create a partial image of the uneven surface at each of the plurality of discrete locations; selectively analyzing each of the partial images; and combining at least portions of the partial images into an overall image of the uneven surface.

20 Claims, 2 Drawing Sheets

U.S. PATENT DOCUMENTS

| | | | |
|---|---|---|---|
| 4,933,976 A | 6/1990 | Fishbine et al. | 382/4 |
| 6,377,700 B1 * | 4/2002 | Mack et al. | 382/154 |
| 6,404,904 B1 | 6/2002 | Einighammer et al. | 382/124 |
| 6,525,331 B1 * | 2/2003 | Ngoi et al. | 250/559.34 |
| 2002/0190190 A1 | 12/2002 | Miramonti et al. | 250/208.1 |
| 2004/0179728 A1 * | 9/2004 | Littlefield et al. | 382/154 |
| 2004/0228519 A1 * | 11/2004 | Littlefield et al. | 382/154 |

FOREIGN PATENT DOCUMENTS

| | | |
|---|---|---|
| EP | 0194783 | 9/1986 |
| EP | 0359554 | 3/1990 |
| EP | 1073988 | 2/2001 |

OTHER PUBLICATIONS

M. Levoy et al., "The Digital Michelangelo Project: 3D Scanning of Large Statues", Computer Graphics. Siggraph 2000, Conference Proceedings, New Orleans, LA, Jul. 23-28, 2000, pp. 131-144, XP001003549, ISBN: 1-58113-208-5.

* cited by examiner

METHOD AND ARRANGEMENT FOR TOUCHLESS DETECTION OF DATA OF UNEVEN SURFACES

The present invention relates to a method and an arrangement for detection of data of uneven surfaces, in particular for acquisition of biometric data at faces and fingers, using a light source for illumination of the uneven surface, an imaging optical system and an analyzing facility for electronic image processing.

BACKGROUND

The acquisition of biometric data is required for many applications. In particular, for the identification of persons and for control of authorization, the accurate and as forgery-proof as possible acquisition of this data is required. Because of their manifold advantages, touchless methods are often used thereby.

On this, a set of possibilities is described in the prior art.

According to European Patent Document EP 0 194 783 B1, a device for detection of data of uneven surfaces is known, where a transparent plate exhibits two opposing surfaces, wherein an uneven surface having recesses and protrusions, which is to be detected, is pressed against one of the even surfaces, comprising a light source for illumination of the uneven surface at the contact section through the transparent plate and an optical element for guidance of the light, which is scattered by the uneven surface, to the light detector.

The light source is arranged in such a way that it illuminates the contact section at an illumination angle which is smaller than a critical angle, in order to that the light incident from the source onto the contact section is not totally reflected, whereby a part of the light, which is scattered at the protrusions of the uneven surface, is undergoing an inner total reflection at least at the second surface of the plate, in order to propagate in a direction against the optical element, whereas the light which is scattered at the recesses is undergoing none such inner total reflection, whereby the two kinds of scattered light are separated spatially, wherein the optical element is arranged to guide only light scattered at the protrusions to the detector.

Furthermore, in European Patent Document EP 0 359 554 B1, an arrangement for the determination of fingerprints is described, with which zones of the finger are imaged to a light receiver. The arrangement possesses a light source, means for guiding the light rays which are running from the light source onto the surface of the finger to be detected, an optical imaging system which creates an image of an irradiated part of the sample, a light detector facility for detecting the image and a facility for the output of a detection signal. Using the arrangement, it shall be determined if the sample is a biological object or an imitation. Therefore, the light detector is provided with a light receiver area which is divided into zones so that an image of the irradiated part is created on the light receiver area. The light detector possesses separate optical outputs for the plurality of light rays received respectively. The discrimination if it is the matter of an authentic object, i.e. a vital finger, or an imitation is carried out by analyzing the course of the light, wherein the phenomenon that, in case of an authentic finger, the light partly enters the finger and, in case of an imitation, does not enter into it so that different courses of light result, is exploited.

In addition, according to European Patent Document EP 1 073 988 B1, a system for recognition of hand and finger lines is known, which serves for the identification of persons. Using this system, hand and/or finger lines, patterns of dermal ridges, patterns of the subcutis or the like are acquired optically for acquisition of an image by using a light source, a polarization filter and a camera without mechanical movements of the arrangement. The optical acquisition is carried out by means of polarization filters placed in the optical path of illumination and in the optical path of imaging and by means of a fixedly arranged camera.

In the case of the known arrangements, it is disadvantageous that the contrast for the imaging of the structures is low so that a secure analysis of the images is made very difficult.

SUMMARY OF THE INVENTION

An object of the present invention is to provide a method and an apparatus of the initially said type which enable touchlessly scanning of uneven surfaces, in particular of a relief made up of dermal ridges, and creating an image of the surfaces true to original with high contrast.

The present invention provides a method for recognition of biometric data, in particular for the recognition of characteristics of fingers and of faces of persons, comprising: illuminating at least one of stripes and a grid on the uneven surface using at least one light source; detecting, without a touching contact, light reflected from the uneven surface at a plurality of discrete locations so as to create a partial image of the uneven surface at each of the plurality of discrete locations; selectively analyzing each of the partial images; and combining at least portions of the partial images into an overall image of the uneven surface. The present invention also provides an arrangement for a touchless detection of data of an uneven surface of an object, comprising: an imaging optical system including an electronic camera oriented perpendicular to the uneven surface; a plurality of line-shaped light sources for illuminating the uneven surface disposed in row on each side of the electronic camera; an analyzing unit for electronic image processing including an electronic control unit couple to the electronic camera and configured to assign a partial image corresponding to each of the plurality of light sources and to process the partial images into an overall image.

Advantageous embodiments are described in the specification and in the claims.

The present invention preferably serves for the optical scanning of dermal ridges. The dermal ridges are embossed and make up a characteristic relief. They distinguish themselves by a higher gloss than the adjacent spacings. By the glossy surface, the light is reflected directionally to a large fraction, wherein the coloration of the reflected light is small. In contrast, the spacings reflect diffusely with a red coloration.

As glossy surfaces reflect directionally, i.e. the light is reverberated according to the law of reflection, this means that light sources mirror themselves in the reflecting area. The dermal ridges thus mirror the light coming from the light source. To achieve a true-to-original and high-contrast image of the ridges, it has to be ensured that only a top edge of the ridge is imaged. As the slope of the finger ridges varies up to about 50° along the finger, for the illumination of the outer ridges which are sloped to a higher extent, the light source is placed differently than the light source intended for the illumination of the object's center.

Conveniently, the camera is arranged perpendicularly to the object so that the light source serving for illumination should be arranged directly next to the camera. However, the camera placed in such a way does not illuminate the outer ridges at their top edges anymore, but rather laterally of those edges. This causes an apparent deformation of the ridges in the image. In order to illuminate the border areas of the object, the light sources are therefore arranged farther outwards.

An advantageous embodiment of the present invention uses the light's color with which the object is illuminated in order to increase the contrast of the image.

If the object is illuminated directionally using white light, the finger ridges appear glossy white, but the spacings diffusely red. By color filtering during the imaging and/or by colored illumination, the contrast can be raised.

In the method according to the present invention, an object to be detected is illuminated in such a way that, in each area of the object, the top edge of the dermal ridges reflects.

In order to identify a finger, the illumination is carried out in such a way that the surface normal in each area of the finger makes up the bisecting line of the angle between the illumination and the camera's objective with the finger's axis as the angular point. But the light source shall not be extensive thereby, but shall not exceed an extent of 15 mm transverse to the finger's axis.

The method can be realized using different arrangements. In particular, such arrangements are suitable which perform the following functions:
  moving the illumination on a path arranged around the object,
  moving the camera on a path arranged around the object,
  arranging several cameras around the object,
  arranging several switchable illuminations,
  arranging several differently colored illuminations and several color-selective cameras,
  arranging several differently colored illuminations and one color camera in an arrangement, wherein the above condition of angle is satisfied.

The spacings between the single dermal ridges are not glossy indeed, but also not dark. In the image, they appear colored red. However, in red light, the structure of the object is hardly recognizable. The contrast of the image can be further increased by creating an image congruent to the images of the dermal ridges in the red or infrared spectral range respectively and subtracting this image from the structure image as a uniform darkness value.

Using the arrangement according to the present invention, a preferably large part of the object is illuminated by the given arrangement in such a way that the light source mirrors itself always exactly in the top edge of the dermal ridge. Only in this case, a true-to-original image results.

If the illumination was carried out using a sufficiently large light source it would indeed be ensured everywhere that the top edge of the ridges mirror any part of the light source. But the side surfaces shine, too, as the remaining parts of the light source responsible for other areas illuminate them. In this case, the dermal ridges appear broad, the contrast between them can get lost completely and the borders of the ridges are imaged in a deformed manner.

It is possible to design the light source in a way such that only light rays are emitted which meet in an axis of the object. This can be achieved, for example, by using parallel light which is focussed by means of a cylindrical lens. Admittedly, this requires a certain effort. Furthermore, the object needs to be placed exactly centrically.

In order to prevent disturbing light from falling onto the side surfaces, the light source can be moved or the light sources are switched on one after the other. Then, for each situation, a separate image is taken.

An advantageous embodiment is designed to arrange several cameras of whose single images an overall image is composed which uses only the accurately illuminated image parts. The difficulty occurring thereby, that the boundaries do not fit exactly because of the unavoidable differences of the single perspectives, can be solved using an appropriate software.

Therefore, it is advantageous to create a separate image using only one camera for each light source and to concatenate the respective accurate areas of the single images to an overall image. Thereby, a large fraction of the images is not required.

This is achieved, for example, by using a CMOS camera, from which each arbitrary pixel can be read out selectively separately. Then, for each lighting situation, one can sequentially read out the well illuminated area of the matrix, as it is known where this area must lie for each light source. Therewith, creating the image is much faster than creating an overall image by joining together. Practically, this can be as fast as if one overall image is taken. During the imaging, the illumination is just switched synchronously through the lighting situations.

Another embodiment uses colored light sources so that the separation is carried out via the single color excerpts. So here, after taking the image, from each color excerpt the optimally illuminated area is taken out and an overall image is created in a frame buffer as black and white image. It is advantageous here that the procedure is performed simultaneously. The effort in software and the lower resolution of the color camera have to be regarded to be disadvantageous.

An especially advantageous embodiment for the recognition of fingers is constituted by an arrangement, wherein a successive switching of the lighting situation is carried out and a CMOS camera is read out synchronously and selectively. Advantageously, the camera is arranged or the reading out is designed, respectively, in such a way that areas parallel to the finger's axis are always read out simultaneously. Purposefully, the light source is also arranged longitudinally parallelly thereto. Thus, the finger is scanned synchronously and selectively line by line, wherein the lines are aligned parallelly to the finger's axis.

BRIEF DESCRIPTION OF THE DRAWINGS

In the following, the present invention is further explained considering an example of an embodiment. The example concerns the recognition of the structure of a finger's dermal ridges.

In the appropriate figure, it is shown by.

DETAILED DESCRIPTION

Figure 1:
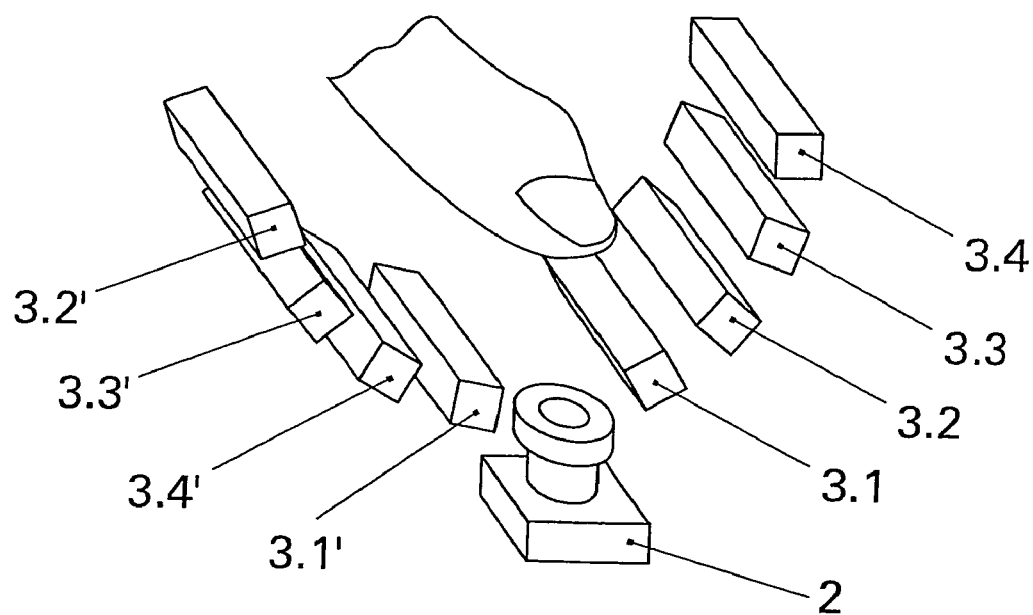
FIG. 1: a schematic illustration of an arrangement with a camera and several light sources arranged around the finger.

In case of the arrangement depicted in FIG. 1, the finger 1 to be scanned is illuminated using a light source consisting of eight LED rows 3 and imaged using a centrally arranged camera 2.

The LED rows 3.1 to 3.4 and 3.1' to 3.4' are arranged in an approximately circular path around the finger 1, wherein adjacent LED rows always exhibit different colors, respectively. The colors repeat after a distance in which no mutual interaction takes place. In the present embodiment, LED rows of four different colors 3.1 to 3.4 and 3.1' to 3.4' respectively, are used. The camera 2 is provided with a facility which creates a separate image for each color.

It is also possible that the light sources are arranged in an array of light emitting diodes.

Figure 2:
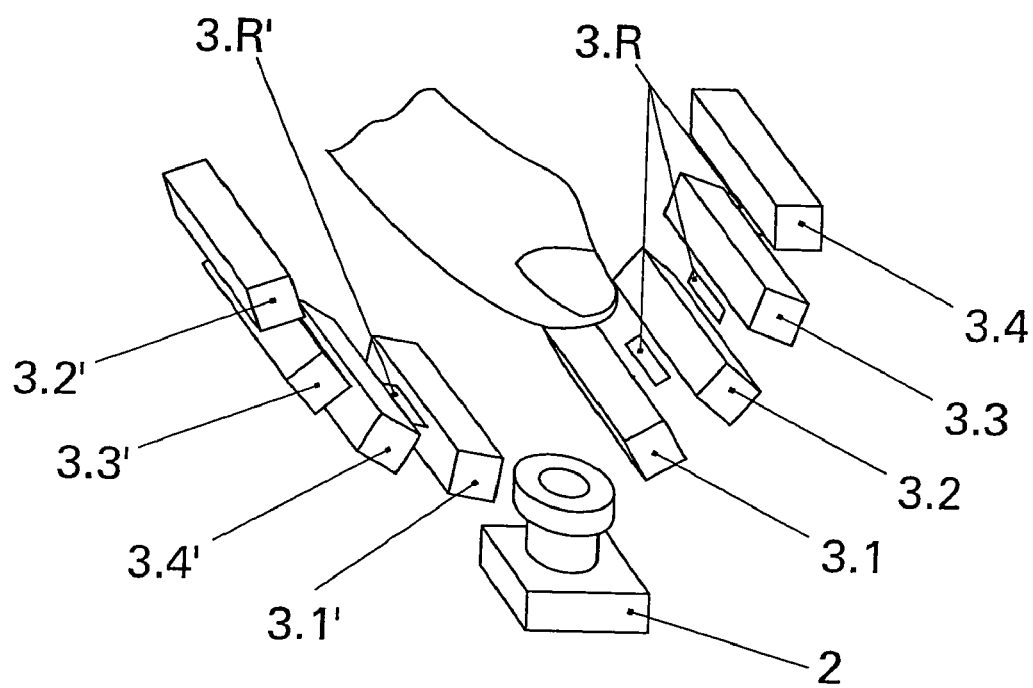
FIG. 2: an arrangement with additionally attached reference diodes shining red.

In FIG. 2, an advantageous embodiment is depicted, where, between the LED rows 3.1 to 3.4 and 3.1' to 3.4' respectively, an additional LED row 3.R which emits red light is arranged between adjacent rows respectively. Therewith, in the camera 2, a fifth color excerpt image can be created which exhibits a weak structure only and serves as a reference of brightness for calculationally joining together the single color excerpts to an overall image. Using the camera 1, for each light source a separate image is created and the single images are concatenated to an overall image. This joining together is carried out using an electronic imaging unit not depicted here.

Preferably, for camera 1 a CMOS camera is used at which the pixels can be read out selectively and can be processed further. For each LED row 3, the matrix area which is assigned to the appropriate edge is read out successively. During the imaging, the lighting situations are synchronously switched through.

Figure 3:
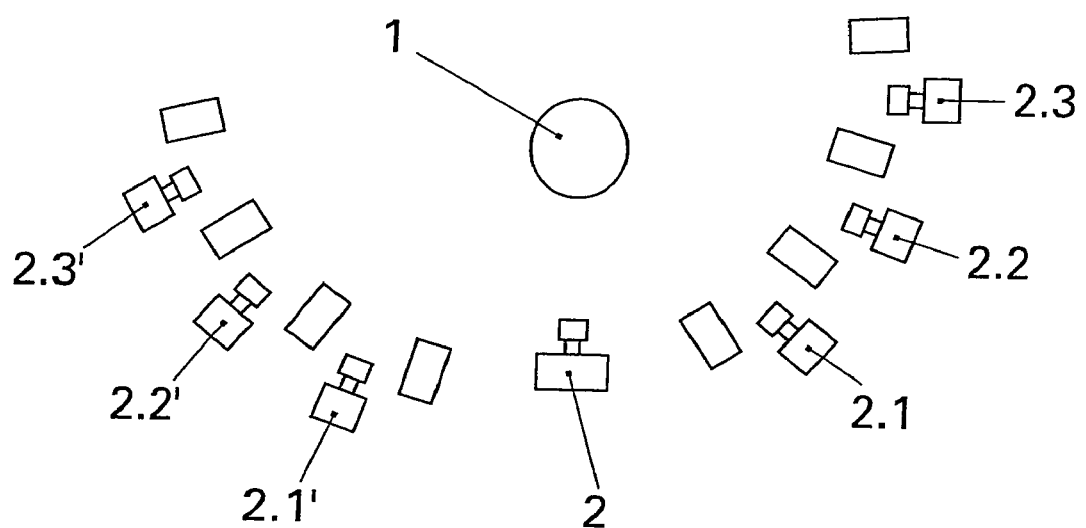
FIG. 3: an embodiment with several cameras.

FIG. 3 shows an embodiment in which several cameras 2 are used. In this variant, an overall image is composed of the single images gained by all cameras 2, by means of the electronic imaging unit, wherein the overall image uses the accurately illuminated image parts only.

Thereby, illumination and/or receivers can be merged by means of beam splitters.

What is claimed is:

1. A method for detecting data of an uneven surface of an object, the method comprising:
    illuminating at least one of stripes and a grid on the uneven surface using at least one light source;
    detecting, without a touching contact, light reflected from the uneven surface at a plurality of discrete locations so as to create a partial image of the uneven surface at each of the plurality of discrete locations;
    selectively analyzing each of the partial images; and
    combining at least portions of the partial images into an overall image of the uneven surface, wherein the illuminating includes moving the at least one light source on a path around the object, and wherein the detecting at the plurality of discrete locations is performed at different points in time.

2. The method as recited in claim 1, wherein the object includes at least one of a face and a finger, and wherein the data includes biometric data.

3. A method for detecting data of an uneven surface of an object, the method comprising:
    illuminating at least one of stripes and a grid on the uneven surface using at least one light source;
    detecting, without a touching contact, light reflected from the uneven surface at a plurality of discrete locations so as to create a partial image of the uneven surface at each of the plurality of discrete locations;
    selectively analyzing each of the partial images; and
    combining at least portions of the partial images into an overall image of the uneven surface, wherein the at least one light source includes a plurality of light sources disposed around the object in an arc-shaped configuration, wherein the illuminating includes sequentially switching on each of the plurality of light sources, and wherein the detecting is performed sequentially according to the switching.

4. The method as recited in claim 1, wherein the detecting is performed using a plurality of cameras and the combining into an overall image includes combining only selected illuminated areas of each of the plurality of partial images.

5. The method as recited in claim 3, wherein only one camera is used to create each of the partial images corresponding to each light source, and wherein respective selected areas of each of the partial images are combined into the overall image.

6. A method for detecting data of an uneven surface of an object, the method comprising:
    illuminating at least one of stripes and a grid on the uneven surface using at least one light source;
    detecting, without a touching contact, light reflected from the uneven surface at a plurality of discrete locations so as to create a partial image of the uneven surface at each of the plurality of discrete locations;
    selectively analyzing each of the partial images; and
    combining at least portions of the partial images into an overalls image of the uneven surface, wherein the selectively analyzing is performed using different wavelengths, wherein the illuminating includes directionally illuminating with white light, wherein the detecting is performed by a camera, wherein color filtering single areas is performed during the detecting so as to create partial images of different wavelengths, wherein the analyzing includes selecting an area and assigning a desired location to the area, and wherein the combining includes combining at least portions of the partial image into an overall black and white image in a frame buffer.

7. The method as recited in claim 6, wherein the illuminating is performed using light of different wavelengths.

8. A method for detecting data of an uneven surface of an object, the method comprising:
    illuminating at least one of stripes and a grid on the uneven surface using at least one light source;
    detecting, without a touching contact, light reflected from the uneven surface at a plurality of discrete locations so as to create a partial image of the uneven surface at each of the plurality of discrete locations;
    selectively analyzing each of the partial images; and
    combining at least portions of the partial images into an overall image of the uneven surface, wherein the selectively analyzing is performed using different wavelengths wherein the at least one light source includes a plurality of light sources synchronously switched on during the detecting, and wherein the detecting includes only one camera so as to create each of the partial images for each light source, and further comprising selecting an area for each of the partial images for each lighting situation using an electronic control unit.

9. A method for detecting data of an uneven surface of an object, the method comprising:
    illuminating at least one of stripes and a grid on the uneven surface using at least one light source;
    detecting, without a touching contact, light reflected from the uneven surface at a plurality of discrete locations so as to create a partial image of the uneven surface at each of the plurality of discrete locations;
    selectively analyzing each of the partial images; and
    combining at least portions of the partial images into an overall image of the uneven surface, wherein the object includes a finger, and wherein the detecting includes scanning the finger line by line selectively, wherein the lines are aligned parallel to an axis of the finger.

10. An arrangement for a touchless detection of data of an uneven surface of an object, comprising:
    an imaging optical system including an electronic camera oriented perpendicular to the uneven surface;
    a plurality of line-shaped light sources for illuminating the uneven surface disposed in row on each side of the electronic camera;

an analyzing unit for electronic image processing including an electronic control unit coupled to the electronic camera and configured to assign a partial image corresponding to each of the plurality of light sources and to process the partial images into an overall image.

11. The arrangement as recited in claim 10, wherein the object includes a finger and wherein the data includes biometric data.

12. The arrangement as recited in claim 10, wherein the plurality of line-shaped light sources includes light emitting diodes.

13. The arrangement as recited in claim 10, wherein the electronic camera is configured to create each of the partial images for each light source, wherein the plurality of light sources are configured to be sequentially switched on, wherein the analyzing unit is configured to process only selected areas of each of the partial images, and wherein the electronic control unit is configured to read out an area of a matrix for each lighting situation and to assign the area of the matrix to a desired location on the object.

14. The arrangement as recited in claim 10, wherein the electronic camera is a CMOS camera.

15. The arrangement as recited in claim 10, further comprising a plurality of additional cameras disposed side by side in a row.

16. The arrangement as recited in claim 10, wherein the plurality of light sources includes a white light source oriented perpendicular to a center of the uneven surface, and further comprising a plurality of additional cameras configured to take spectrally filtered partial images disposed in a row alongside the white light source.

17. The arrangement as recited in claim 10, wherein the plurality of light sources include at least two light sources radiating at a same wavelength and a third light source disposed between the at least two light sources and radiating at a different wavelength.

18. The arrangement as recited in claim 12, wherein the light emitting diodes radiate at wavelengths in a range of about 400 nm to about 3 μm.

19. The arrangement as recited in claim 12, further comprising an additional light source radiating red and disposed in the row as an illumination of reference.

20. The arrangement as recited in claim 19, wherein the additional light source radiates at a wavelength of at least one of 660 nm and 800 nm.

* * * * *